Aug. 13, 1963       J. P. WHELAN       3,100,562
CONTAINER HANDLING APPARATUS
Filed Oct. 26, 1960                    13 Sheets-Sheet 1

Fig. I

INVENTOR.
James P. Whelan
BY
Robert R. Churchill

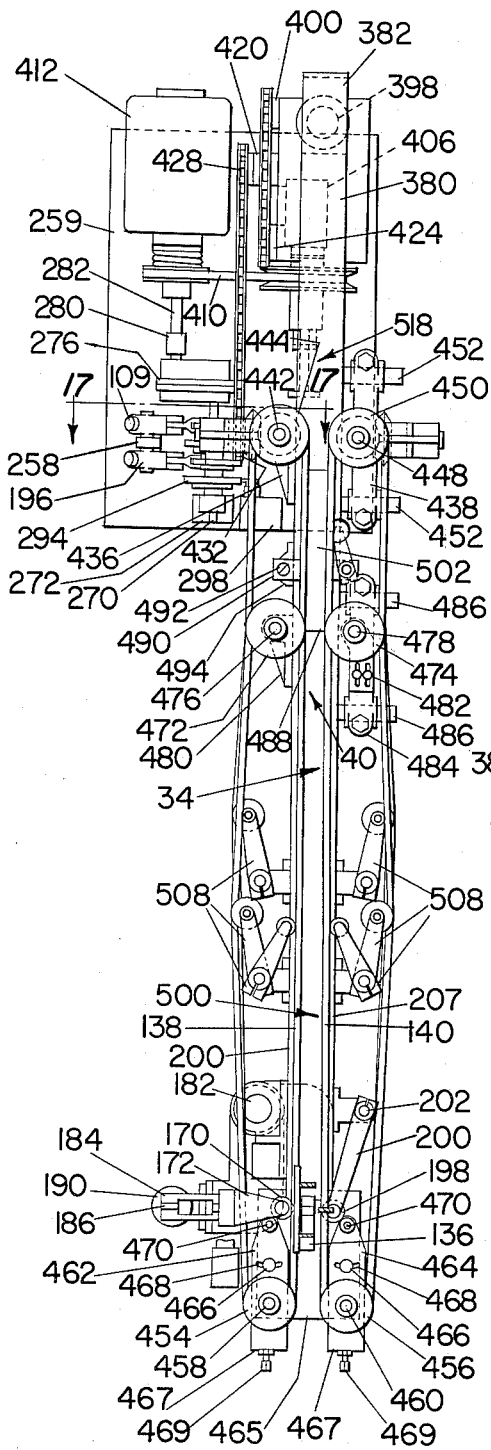
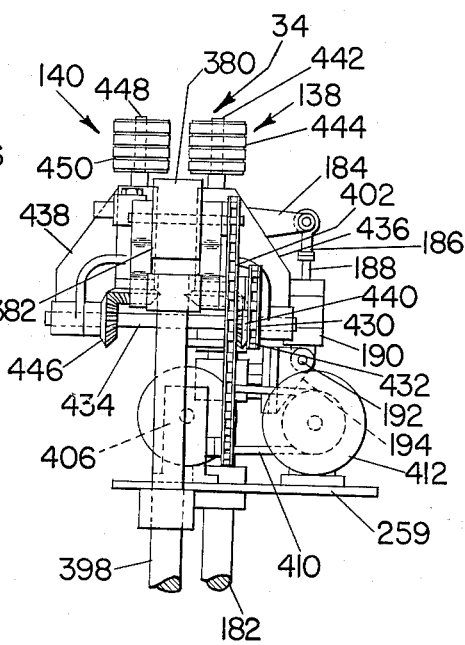
Fig. 2
Fig. 3
INVENTOR.
James P. Whelan
BY
Robert R. Churchill Aug. 13, 1963     J. P. WHELAN     3,100,562
CONTAINER HANDLING APPARATUS
Filed Oct. 26, 1960     13 Sheets-Sheet 3

INVENTOR.
James P. Whelan
BY Robert R. Churchill

Aug. 13, 1963   J. P. WHELAN   3,100,562
CONTAINER HANDLING APPARATUS
Filed Oct. 26, 1960   13 Sheets-Sheet 4

INVENTOR.
James P. Whelan
BY
Robert R. Churchill

Aug. 13, 1963  J. P. WHELAN  3,100,562
CONTAINER HANDLING APPARATUS
Filed Oct. 26, 1960  13 Sheets-Sheet 5

*INVENTOR.*
James P. Whelan
BY Robert R. Churchill

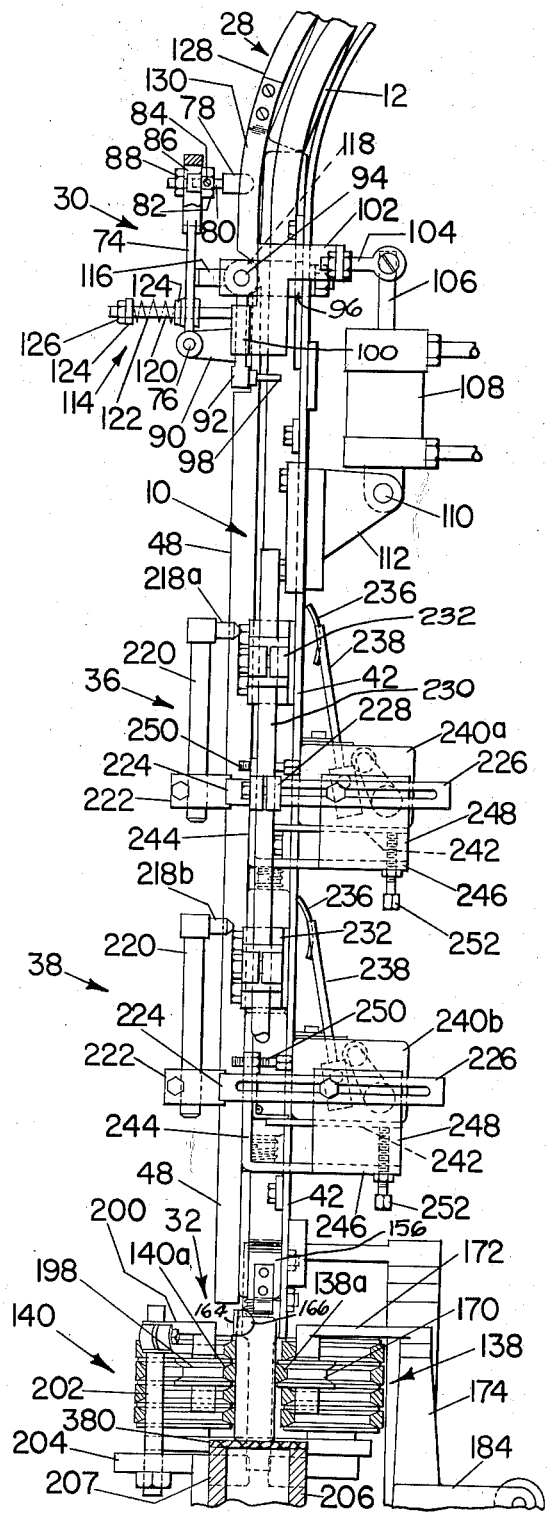

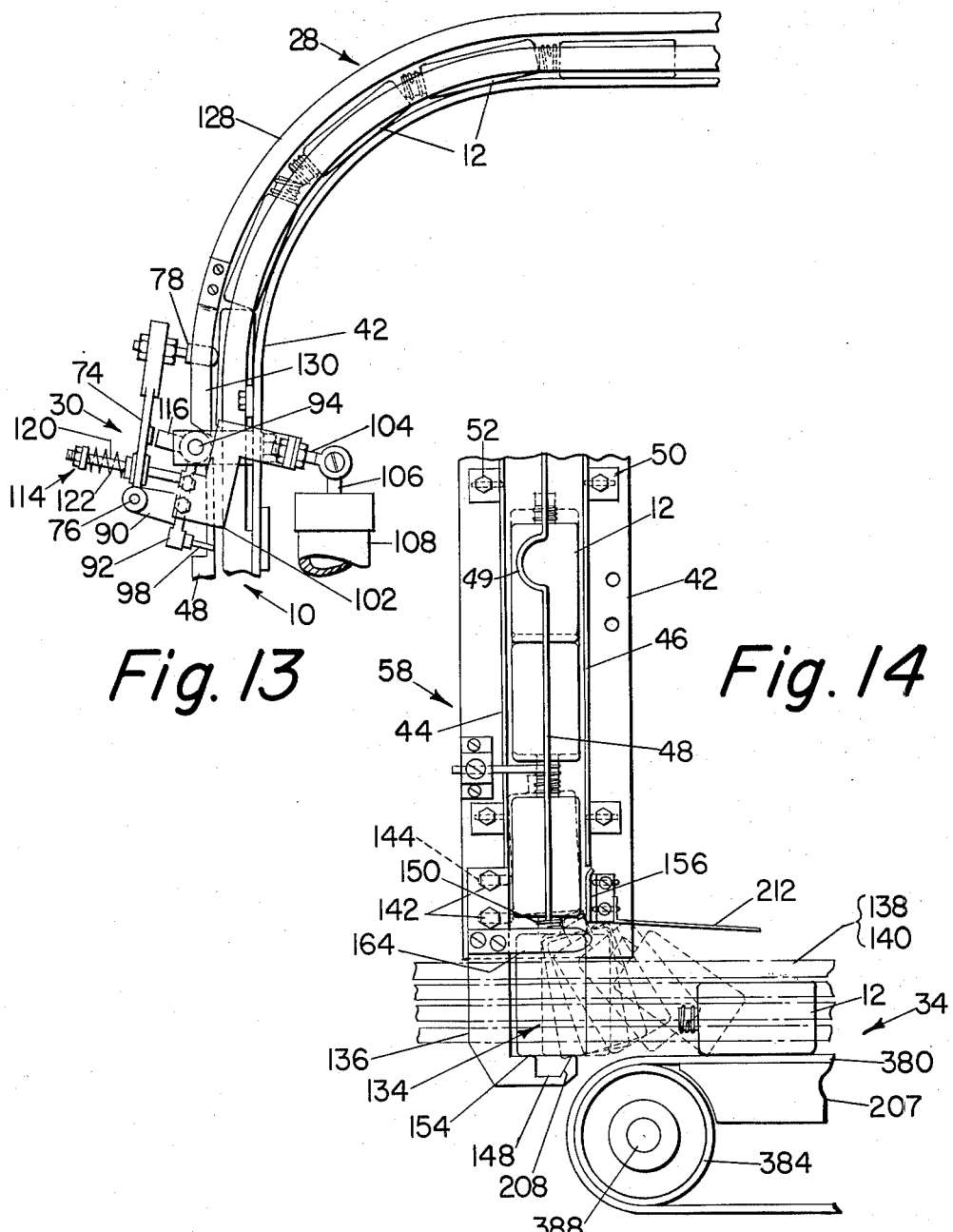

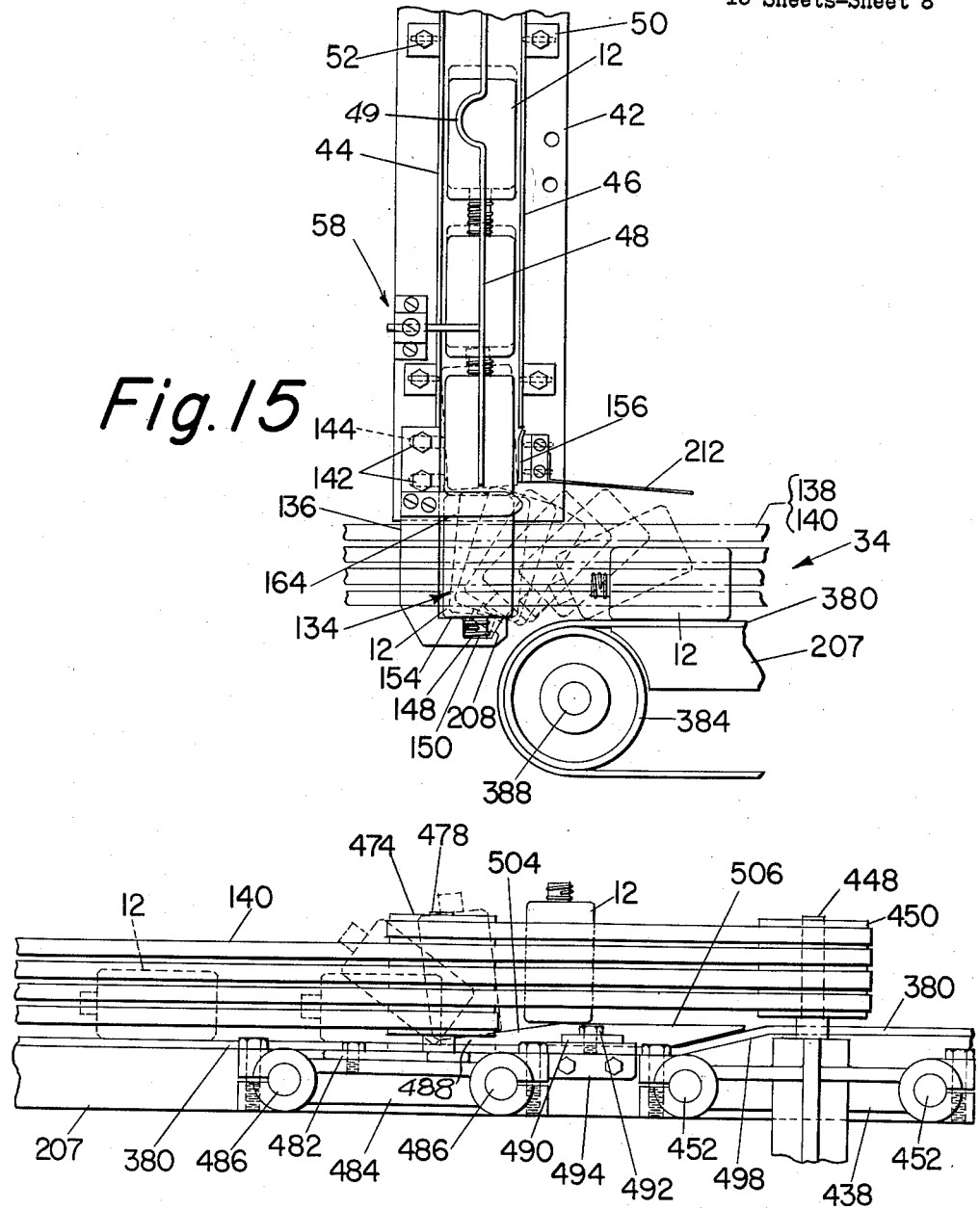

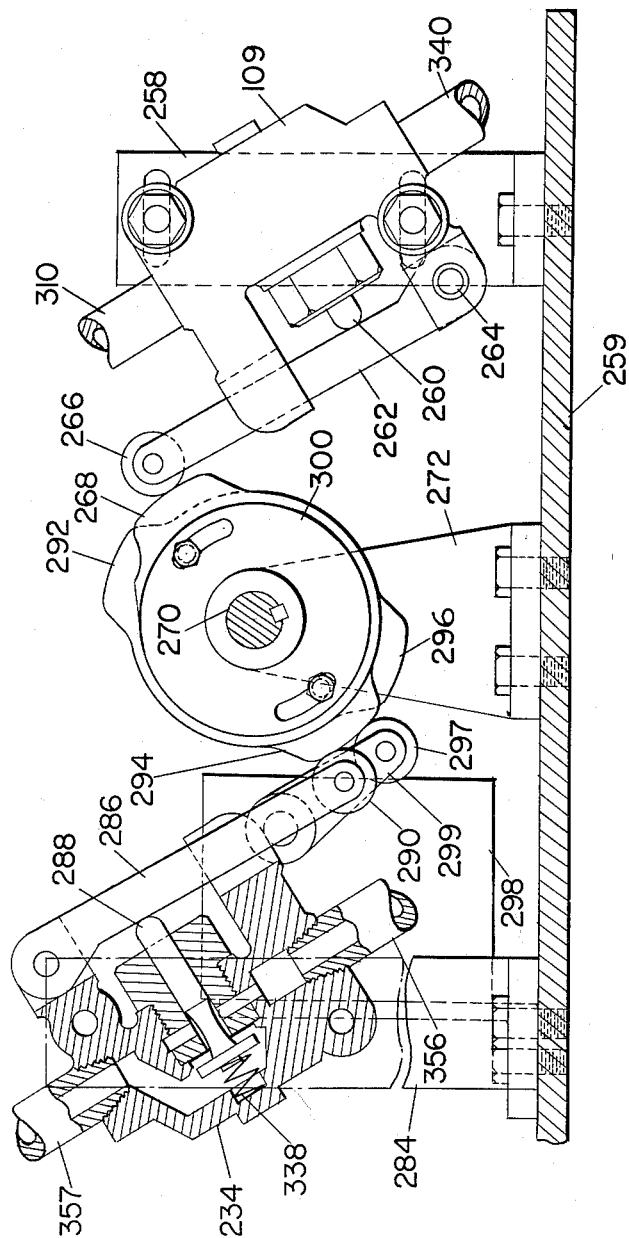

INVENTOR.
James P. Whelan

INVENTOR.
James P. Whelan
BY
Robert R. Churchill

United States Patent Office 3,100,562
Patented Aug. 13, 1963

3,100,562
CONTAINER HANDLING APPARATUS
James P. Whelan, Quincy, Mass., assignor to Pneumatic Scale Corporation, Limited, Quincy, Mass., a corporation of Massachusetts
Filed Oct. 26, 1960, Ser. No. 65,191
20 Claims. (Cl. 198—33)

This invention relates to container handling apparatus.

The invention has for an object to provide novel and improved container handling apparatus having provision for orienting and arranging containers to present the same in a line and in an upright condition in a simple, novel and efficient manner.

Another object of the invention is to provide a novel and improved method of orienting and arranging containers to present the containers in a line and in an upright condition.

With these general objects in view and such others as may hereinafter appear, the invention consists in the container handling apparatus and in the method of handling containers as hereinafter described and particularly defined in the claims at the end of this specification.

In the drawings illustrating the preferred embodiment of the invention:

FIG. 1 is a side elevation of container handling apparatus embodying the present invention;

FIG. 2 is a plan view of the same as seen from the line 2—2 of FIG. 1;

FIG. 3 is an end view as seen from the right hand side of FIG. 1 showing a portion of the driving mechanism;

FIG. 12 is a view in side elevation of the guide chute and control mechanism shown in FIG. 6;

FIG. 13 is a detail view of the container releasing mechanism shown in a different position of operation;

FIG. 14 is a detail view showing the manner of transferring and orienting an upright lowermost container from the vertical chute to the horizontal conveyer;

FIG. 15 is a similar view showing the manner of transferring and orienting an upside down lowermost container from the vertical chute to the horizontal conveyer;

FIG. 16 is a detail view in side elevation of the bottle righting mechanism;

FIG. 17 is a side elevation of a cam shaft and the poppet valves associated therewith forming a part of the timing mechanism, one of the valves being shown in cross section;

Figures 4, 5:
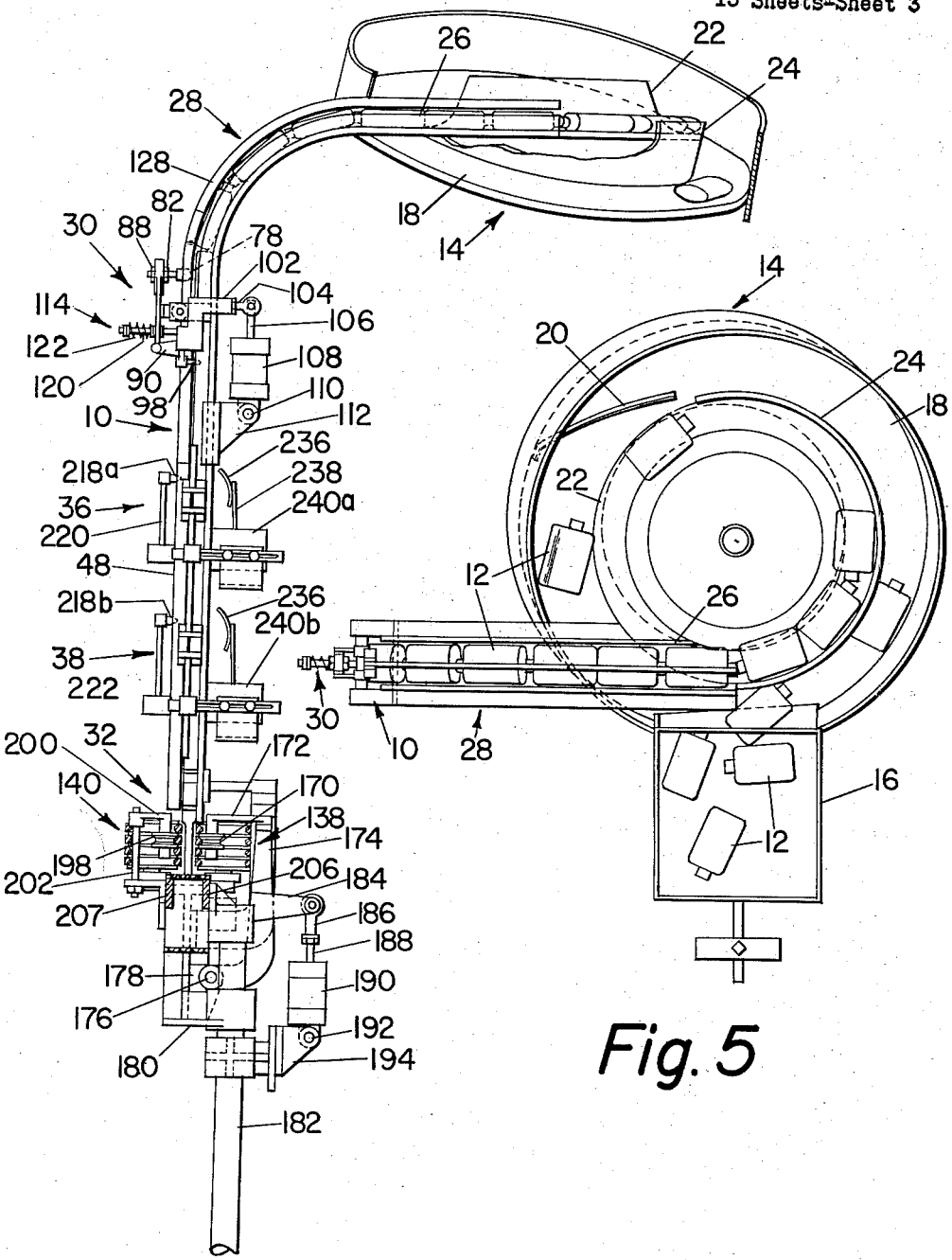
FIG. 4 is a side elevation of the vertical guide chute as seen from the line 4—4 of FIG. 1 and showing the feeding mechanism for aligning and depositing the containers into the chute.
FIG. 5 is a plan view of the container feeding mechanism shown in FIG. 4.

In general the present invention contemplates novel container handling apparatus particularly adapted for use in connection with the supply conveyer of a container filling machine or with other machines, such as a container cleaning machine, wherein it is desired to deliver the containers, such as bottles, in a row and in an upright condition. In the illustrated embodiment of the invention provision is made for continuously withdrawing bottles at random from a bulk supply thereof and for depositing the bottles longitudinally into the upper end of a vertical chute. The present apparatus is particularly adapted for handling relatively lightweight plastic bottles, and the bottles deposited end to end in the vertical chute may be arranged with their open ends facing in either a leading or trailing direction. Provision is then made for transferring and orienting successive lowermost bottles in the vertical chute onto a horizontal conveyor with the closed ends of the bottles facing in a leading direction. Thereafter, the bottles are raised upright on the conveyer to be delivered in a row to the supply conveyer of a bottle cleaning or filling machine.

Provision is made in the preferred embodiment of the invention for controlling the feed of the bottles through the vertical chute in a manner such as to admit bottles into the upper end of the chute in timed relation to the withdrawal of bottles from the lower end of the chute. Provision is also made for controlling the height of the group of longitudinally aligned bottles in the chute within maximum and minimum limits to assure proper functioning of the orienting mechanism as will hereinafter be more fully described. The illustrated orienting mechanism includes provision for gripping the opposed sides of the lowermost bottles at points medially thereof and for advancing the bottle thus gripped while at the same time impeding the advance or passage of the open end or neck of the bottle whether it is arranged upright or upside down in the vertical chute whereby to effect rotation of the bottle about its medially gripped portion in a direction such as to dispose the closed end of each bottle in a leading direction on the horizontal conveyer.

Referring now to the drawings, in general the present container handling apparatus includes a vertical guide chute 10 into which the containers, such as plastic bottles 12, are deposited longitudinally without regard for whether the open end of the bottle is disposed in a leading or trailing direction. The bottles 12 may be deposited in the vertical chute 10 in any preferred manner, either manually or automatically, and as herein shown, the bottles are automatically deposited in the chute by article handling mechanism indicated generally at 14 adapted to withdraw bottles at random from a bulk supply thereof and to arrange the bottles longitudinally without regard for the disposition of the open end so that some of the bottles may enter the vertical chute with their open ends in a leading direction, and other bottles may enter the chute with their closed ends in a leading direction.

The article handling mechanism 14 may and preferably will comprise the mechanism illustrated and described in the United States patent to Sterling, No. 2,715,978, modified to handle the plastic bottles and to deposit them longitudinally into the upper end of the chute 10, as described, reference being made to said patent for a more complete disclosure of the structure and mode of operation of such machine.

As herein shown, in the operation of the article handling machine 14, hereinafter referred to as the bottle feeding mechanism, the plastic bottles 12 withdrawn from a supply hopper 16 are deposited on a rotary carrier 18 arranged at an incline. The bottles are carried upwardly by the rotary carrier into engagement with guide means indicated at 20 to form a line of longitudinally extended bottles. Successive bottles arriving at the upper end of the inclined carrier 18 are guided onto the beveled marginal edge of a rotary disk 22 arranged in a substantially horizontal plane, and as the bottles are advanced along the edge of the disk 22 they leave the carrier 18 and are supported between the disk and a cooperating stationary supporting rail 24. In operation those bottles assuming the desired position between the disk and the rail are advanced into the upper end of a horizontal portion 26 of the feed chute 10, and those bottles assuming other than a desired position are permitted to fall back onto the carrier 18 to be again guided upwardly onto the rotary disk 22. Successive bottles deposited into the horizontal portion 26 of the chute are guided through a curved portion 28 to enter the vertical chute 10.

The bottles supplied to the chute 10 by the feeding mechanism 14 are arranged to be released successively at a predetermined rate or number of bottles per minute by container releasing mechanism indicated generally at 30, such rate of release corresponding to the rate of withdrawal of successive bottles from the lower end of the chute whereby to maintain a predetermined head or reservoir of bottles in the chute to assure proper functioning of the orienting and transferring mechanism indicated generally at 32. The orienting and transferring mechanism 32 is arranged to transfer successive lowermost bottles in the chute from a vertical position to a horizontal position and to deposit the containers in longitudinal alignment on a conveyer 34 with the closed ends of the bottles all facing in a leading direction. In order to assure maintenance of a predetermined head of bottles in the chute within minimum and maximum limits, upper and lower detecting mechanisms are provided as indicated at 36 and 38, respectively, the upper detecting mechanism 36 being arranged to render the releasing mechanism 30 inoperative when a maximum height of bottles in the chute is reached, and the lower detecting mechanism 38 being arranged to render the orienting and transferring mechanism 32 inoperative when a minimum height of bottles in the chute is reached.

Successive bottles transferred to the conveyor 34 in longitudinally aligned relation and with the closed ends all facing in a leading direction are carried to bottle righting mechanism indicated generally at 40 arranged to stand successive bottles upright on the conveyer. The upright row of bottles thus formed may then be transferred to a supply conveyer for delivery to a bottle filling or cleaning machine or other instrumentality for performing subsequent operations on the bottles.

Figure 6:
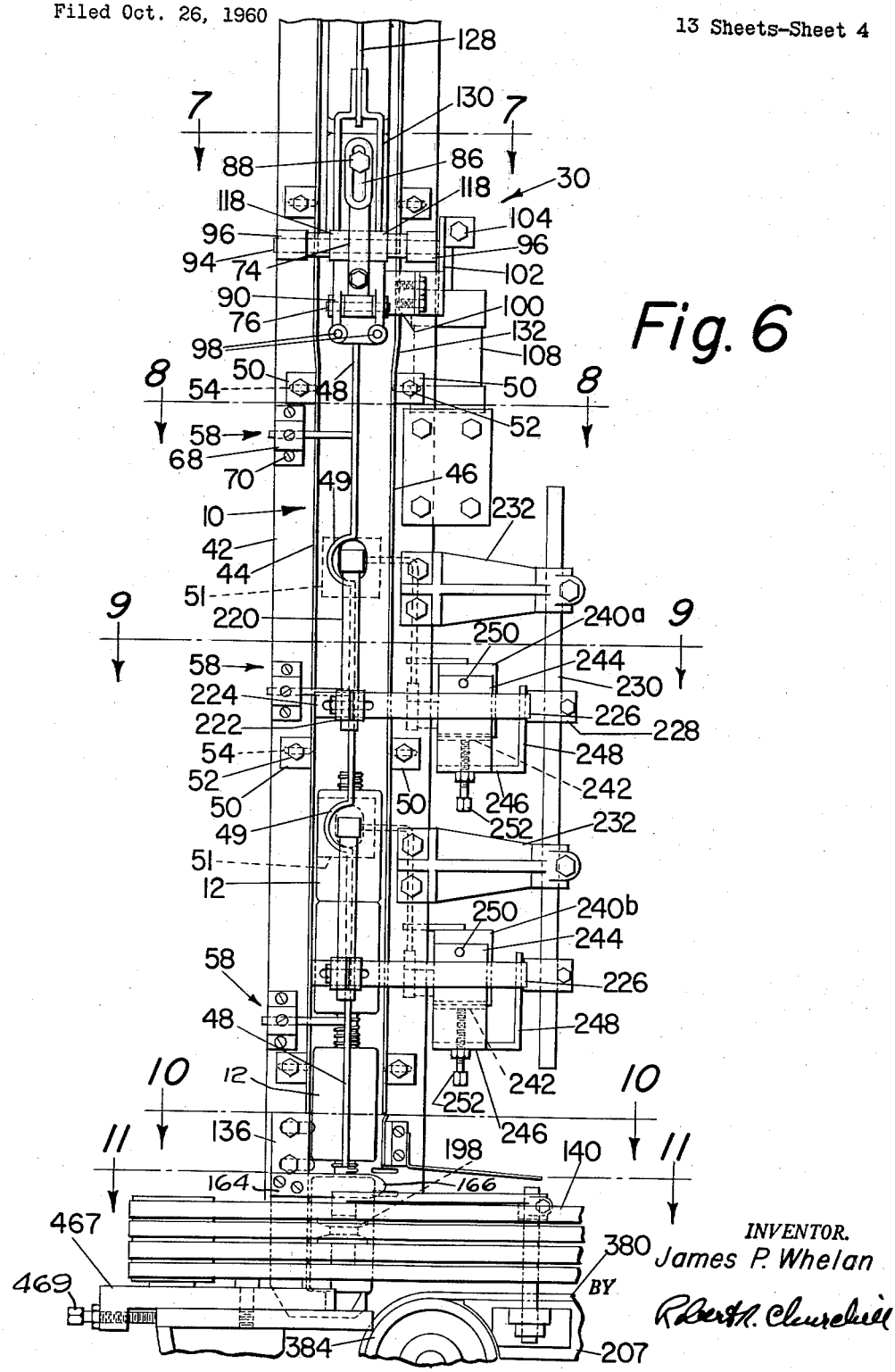
FIG. 6 is a view in front elevation of the guide chute showing control mechanism for releasing successive containers and for maintaining a predetermined height of containers in the chute.
Figure 7:
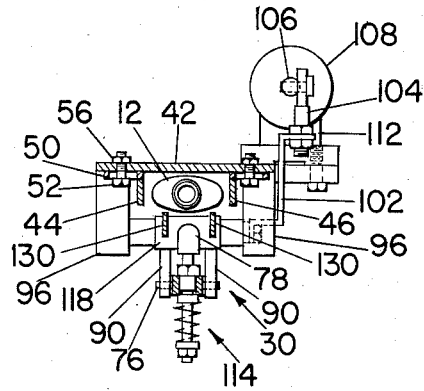
FIGS. 7 to 11 are horizontal cross sectional views taken on the lines 7—7 to 11—11, respectively, of FIG. 6.
Figure 8:
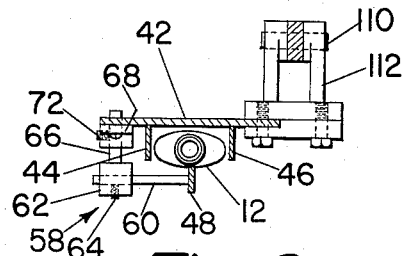

As illustrated in FIGS. 6 and 12, the vertical chute 10 may comprise a rear guide plate or supporting plate 42 extending between the bottle feeding mechanism 14 and the conveyer 34; opposed side guide plates 44, 46 secured to the rear plate 42; and a front guide bar 48, also supported from the rear plate 42. The side plates 44, 46 are provided with laterally extended ears 50, see FIG. 7, having openings for receiving bolts 52 which extend through slotted openings 54 formed in the rear plate 42 whereby the side plates may be adjusted laterally to accommodate bottles of different widths. Each bolt 52 is provided with a nut 56 for securing the side plates in their adjusted position. The front guide bar 48, as illustrated in cross section in FIG. 8, is supported at spaced intervals by supporting units 58, each including a rod 60 adjustably mounted in a block 62 whereby to effect lateral adjustment of the bar, a set screw 64 being provided to secure the rod 60 in its adjusted position. The block 62 is carried on the end of a second rod 66 which is supported for longitudinal adjustment in a bracket 68 secured to the rear plate 42 by bolts 70. A set screw 72 is provided for securing the rod 66 in its adjusted position. The plastic bottles 12 illustrated herein are generally oval or elliptical in cross section, and the inside dimensions of the chute are such as to provide clearance to permit the bottles to fall freely by gravity through the chute 10.

The mechanism for controlling the feed of the bottles through the chute so as to maintain a group of a predetermined number or height of bottles in the chute within maximum and minimum limits to assure efficient operation of the orienting and transferring mechanism 32 is also illustrated in FIGS. 6 and 12. The feed control mechanism includes the bottle releasing means indicated generally at 30 which is arranged to release successive bottles in timed relation to the withdrawal of the bottles from the lower end of the chute. The feed control mechanism is also arranged to space the bottles to permit release of only one bottle each cycle of operation of the apparatus. The bottle releasing mechanism 30 is disposed adjacent the upper end of the vertical chute 10 and, as herein shown, includes a bottle engaging and releasing arm 74 pivotally mounted at its lower end on a pin 76. The upper end of the arm 74 is provided with a rubber bumper 78 carried by a stud 80 mounted for longitudinal adjustment in an opening formed in the headed end of a shoulder screw 82. A set screw 84 in the head of the shoulder screw is provided to secure the stud 80 in its adjusted position. The shoulder screw extends through an elongated slot 86 formed in the arm 74 to permit adjustment of the rubber bumper unit longitudinally of the chute, the screw 82 being secured in its adjusted position by a nut 88.

The pivot pin 76 is carried between spaced arms 90 extended from a rocker arm 92 which latter is mounted to rock on a shaft 94 carried between spaced bearing blocks 96 extended from and secured to the supporting plate 42 of the chute 10. The lower end of the rocker arm 92 is provided with a pair of spaced pins 98 arranged to be rocked into and out of the path of the bottles released by the arm 74. As shown in FIGS. 6 and 12, a lateral extension 100 from the rocker arm 92 is connected by an offset connecting plate 102 to a link 104 connected to the piston stem 106 of a double acting air cylinder 108. The air cylinder is pivotally connected at its lower end to a pin 110 carried by a bracket 112 secured to the supporting plate 42. As illustrated in FIGS. 7 and 12, the bottle releasing arm 74 pivoted at 76 is resiliently urged in a clockwise direction by a compression spring unit 114 and is limited in its movement in this direction by a stop comprising an extension 116 from the hub 118 of the rocker arm 92. The compression spring unit 114 includes an elongated stud 120 which extends through a clearance opening in the releasing arm 74 and is threadedly secured to the rocker arm 92. A coil spring 122 is interposed between spring end washers 124, one of which engages the outer face of the arm 74, the other washer engaging a nut 126 carried by the outer end of the stud 120.

The air cylinder 108 forms a part of a pneumatic control system diagrammatically illustrated in FIG. 18, to be hereinafter described, and which includes a cam operated poppet valve arranged to effect rocking of the rocker arm 92 and its associated releasing arm 74 each cycle through the linkage described, in timed relation to the withdrawal of the bottles from the lower end of the chute. Thus, the line of bottles 12 deposited in the chute 10 by the feeding mechanism 14 is alternately stopped and released, the rubber bumper 78 being arranged to engage and release successive leading bottles 12 being supplied to the upper end of the chute by the feeding mechanism 14.

In operation it will be seen that when the releasing arm 74 is rocked outwardly to release the line, the rocker arm 92 is rocked inwardly to present the pins 98 in the path of the foremost bottle in the line, and when the arm 92 is rocked outwardly to withdraw the pins 98 and permit passage of the foremost bottle, the succeeding bottle will be engaged and held by the rubber bumper 78 upon inward rocking of the arm 74. In practice the rubber bumper 78 engages a side wall of the bottle, and when the bottle is engaged, the arm 74 may yield, as illustrated in FIG. 13, by virtue of the compression spring unit 114 and the pivotal mounting 76.

As shown in FIGS. 12 and 13, a front guide bar 128 forming a part of the curved portion 28 of the chute terminates at a point directly above the releasing unit 30 and is provided with two spaced guide bars 130 connected to and depending from the bar 128 to provide clearance for the releasing unit. The spaced guide bars 130 terminate immediately above the rocker arm hub 118 as shown in FIG. 12. The upper end of the vertical front guide bar 48 terminates immediately below the rocker arm hub 118 and is cut out to provide clearance for the rocker arm 92, the spaced pins 98 straddling the bar 48 as shown.

From the description thus far it will be seen that successive bottles supplied to the upper end of the chute by the feeding mechanism 14 are released singly to fall by gravity through the chute, and in operation the air cylinder 108 is controlled to effect periodic release of the bottles in timed relation to the withdrawal of bottles from the lower end of the chute whereby to maintain a substantially constant head or reservoir of bottles above the lowermost bottle. In the operation of the feeding mechanism 14 the bottles arranged longitudinally on the rotary disk 22 are directed into the open end of the horizontal portion of the chute and, as herein shown, in order to provide ample clearance for passage of successive bottles from the rotary disk 22 into the chute, the horizontal portion 26 and also the curved portion 28 of the chute is made relatively wider, as viewed in front elevation, than the vertical portion of the chute, the entrance to the vertical portion being defined by a flared or tapered section indicated at 132. The width of the vertical portion of the chute 10 is such as to more closely confine the bottles. In practice when a bottle enters the wider portion of the chute with the neck portion trailing and the next succeeding bottle enters the chute with the neck portion leading, such neck portions instead of meeting end to end may be offset relative to each other in the wider portion of the chute so that the neck portions of the pair may be aligned side by side in the same plane. When such neck portions are threaded, interlocking may occur. In operation such interlocked bottles will be separated by the rubber bumper releasing arm which engages the bottles disposed above the reduced or narrower portion of the chute. Thus, when the first bottle of the interlocked pair is released in the wider portion of the chute, the second bottle will be engaged and retained by the rubber bumper during the next cycle so that the first bottle is free to fall into the narrower portion of the chute.

It will be understood that in normal operation successive bottles are released periodically, at the rate of 120 bottles per minute, for example, and the timing and spacing of the upper and lower rocking elements 74, 92 is such that when the leading bottle is released by outward rocking of the rubber bumper 78 the spaced pins 98 will be rocked into the path of the falling bottle. However, in practice the pins 98 will be withdrawn and the next bottle engaged and held before the first bottle engages the pins and will fall past the pins before they are again rocked inwardly so that successive bottles may fall freely past the pins 98 during normal operation at a uniform cyclical rate. However, in the event that a released bottle fails to fall freely at the predetermined cyclical rate when released by the rubber bumper, such bottle will be caught in its fall by the pins 98 and will prevent release of a succeeding bottle until the first bottle is released by the spaced pins during a succeeding cycle so as to maintain the timed rate of fall of succeeding bottles.

Also, in the event that the apparatus is stopped with the rubber bumper releasing arm in its retracted position and the feeding mechanism 14 is started before starting the releasing mechanism, the bottles deposited in the chute would be stopped by the spaced pins 98 extended into the path of the line of bottles at this time, thus preventing complete filling or choking of the chute. Thereafter, when the releasing mechanism is started, the first bottle will be released by withdrawal of the pins 98, and the succeeding bottle will be released by the rubber bumper 78 to resume normal operation wherein successive bottles 12 are permitted to pass without engaging the spaced pins. In other words, the function of the spaced pins is to serve as a safety device and also as a timing device to prevent passage of a bottle into the group except at a predetermined time in the cycle and to prevent complete filling of the chute.

Successive lowermost bottles 12 in the vertical chute 10 come to rest in a pocket 134 defined by an L-shaped bracket 136 and between continuously moving side belts, herein shown as a series of vertically spaced and opposed V-belts indicated generally at 138, 140, leaving the pocket open on one side through which successive bottles 12 are advanced and turned on their side to transfer the bottles onto the conveyor 34 in a horizontal position with the closed ends in a leading direction. As herein shown, the vertical leg of the bracket 136 is connected at its upper end to the supporting plate 42 by bolts 142 which extend through horizontal adjusting slots 144 in the plate 42, the bracket 136 being secured in its adjusted position by nuts 146. The horizontal leg of the bracket 136 is provided with a cutout 148 providing a clearance space for the neck 150 of a bottle 12 which is received upside down in the pocket, the shoulders 152 of the bottle resting on the upper surface 154 of the horizontal leg. When the lowermost bottle 12 is received right side up in the pocket 134 the bottom or closed end will rest on the upper surface 154, thus presenting the neck or open end of the bottle in a plane higher than the plane of the closed end of an upside down bottle since the neck of the latter is disposed in the clearance cutout 148 in the horizontal leg of the pocket. The front guide bar 48 and the side guide members 44, 46 terminate above the pocket, and a separate adjustable tripping extension 156 of the side guide 46 adjacent the open end of the pocket is arranged in the plane of the neck portion 150 of a bottle received right side up in the pocket. As herein shown, the extension 156 which defines the upper edge of the open end of the pocket is secured to the supporting plate 42 by bolts 158 which extend through slots in the supporting plate 42 and are secured in their adjusted position by nuts 160. The space between opposed side belts 138, 140 provides sufficient clearance for the bottle to fall freely therebetween into the pocket.

Provision is made for periodically pressing inwardly an intermediate one of the vertically spaced series of continuously moving belts 138 into gripping engagement with the lowermost bottle, preferably so as to engage a medial portion of the bottle between the pressed belt and its opposing belt 140. In the illustrated embodiment of the invention there are four vertically spaced V belts on each side of the bottle, and the intermediate belt, herein indicated at 138a, comprises the one next to the upper belt of the series 138 which is aligned substantially medially of the length of the bottle. Such selected belt 138a is periodically pressed inwardly to grip and advance the bottle out through the open end of the pocket. However, in order to prevent premature engagement of the lowermost bottle with the side belts and consequent forward displacement out of the pocket prior to the gripping operation, provision is made for supporting the bottle laterally in the pocket out of engagement with the belts.

As herein shown, when the bottles being run are of a height such that the lowermost bottle in the pocket 134 extends above the side belts, as illustrated in FIG. 12, the rear supporting plate 42 may extend downwardly to terminate just above the upper belt of the side belts 138 so as to provide a lateral support at the upper end of the lowermost bottle as shown. When thus supported, the adjacent face of the bottle in the pocket 134 is maintained in spaced relation to the side belts 138. The opposite face of the bottle, adjacent the side belts 140, is supported at the upper end of the bottle by a relatively thin, flat spring metal arm 164 secured to and extended from the vertical leg of the L-shaped bracket 136 and is arranged to loosely engage the side of the bottle to prevent lateral displacement into engagement with the side belts 140. The forward or free end of the spring arm 164 is curved inwardly slightly, as indicated at 166, to provide a resilient barrier temporarily preventing forward movement of the bottle out of the pocket 134. Thereafter, when the selected intermediate belt 138a is pressed inwardly the bottle is moved laterally into gripping engagement with an opposing belt 140a, the relatively thin spring arm 164 being resiliently moved outwardly at this time, and during the positive advance of the gripped bottle between the belts the curved portion 166 of the arm will also be resiliently moved out of the way to permit forward movement of the bottle out of the pocket.

As illustrated in FIGS. 2 and 4, the orienting and transferring mechanism 32, which may be termed the "bottle gripping" and "turning mechanism," for periodically pressing inwardly the belt 138a into gripping and advancing engagement with the medial portion of the lowermost bottle includes a roller 170 engageable with the belt 138a and which is carried by a horizontally extended arm 172 secured to the upper end of a rocker arm 174 mounted to rock on shaft 176. The shaft 176 is carried between spaced extensions 178 from a supporting bracket 180 secured to an upright floor stanchion 182. The rocker arm 174 is provided with laterally extended arms 184 connected by a link 186 to the piston stem 188 of an air cylinder 190 pivotally supported at its lower end on a shaft 192 carried by a bracket 194. The bracket 194 is adjustably supported on the stanchion 182.

Figure 18:
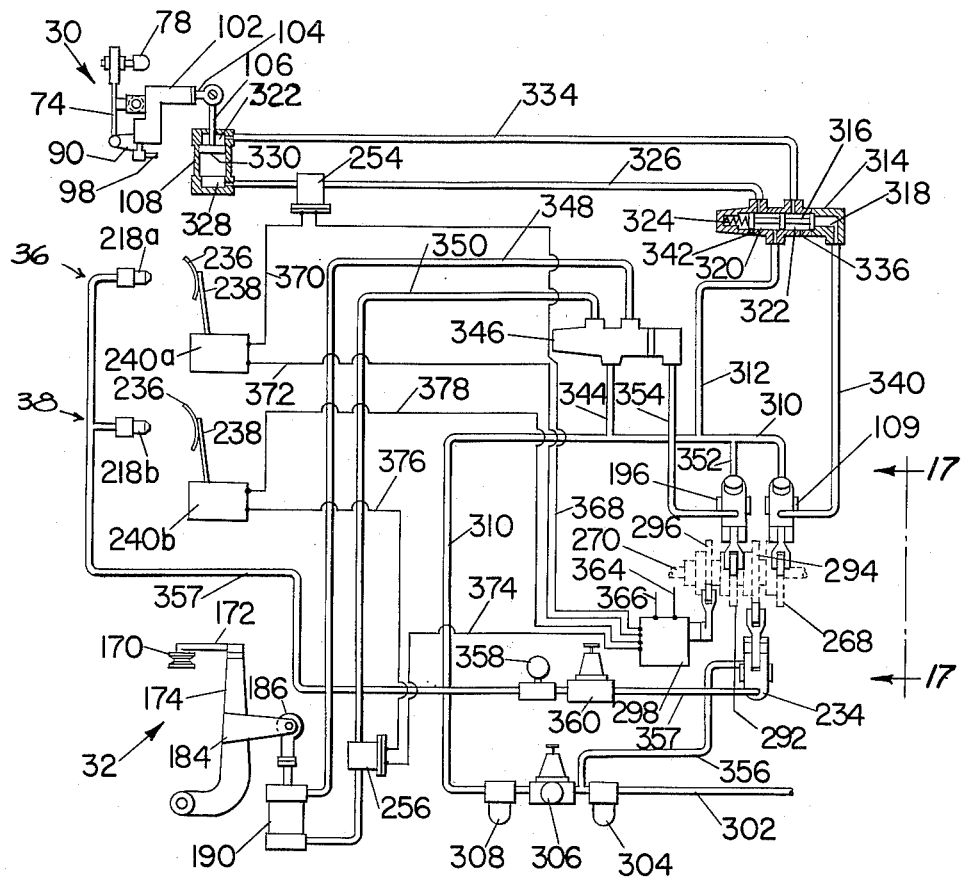
FIG. 18 is a diagrammatic view of the pneumatic and electrical control system.
Figure 19:
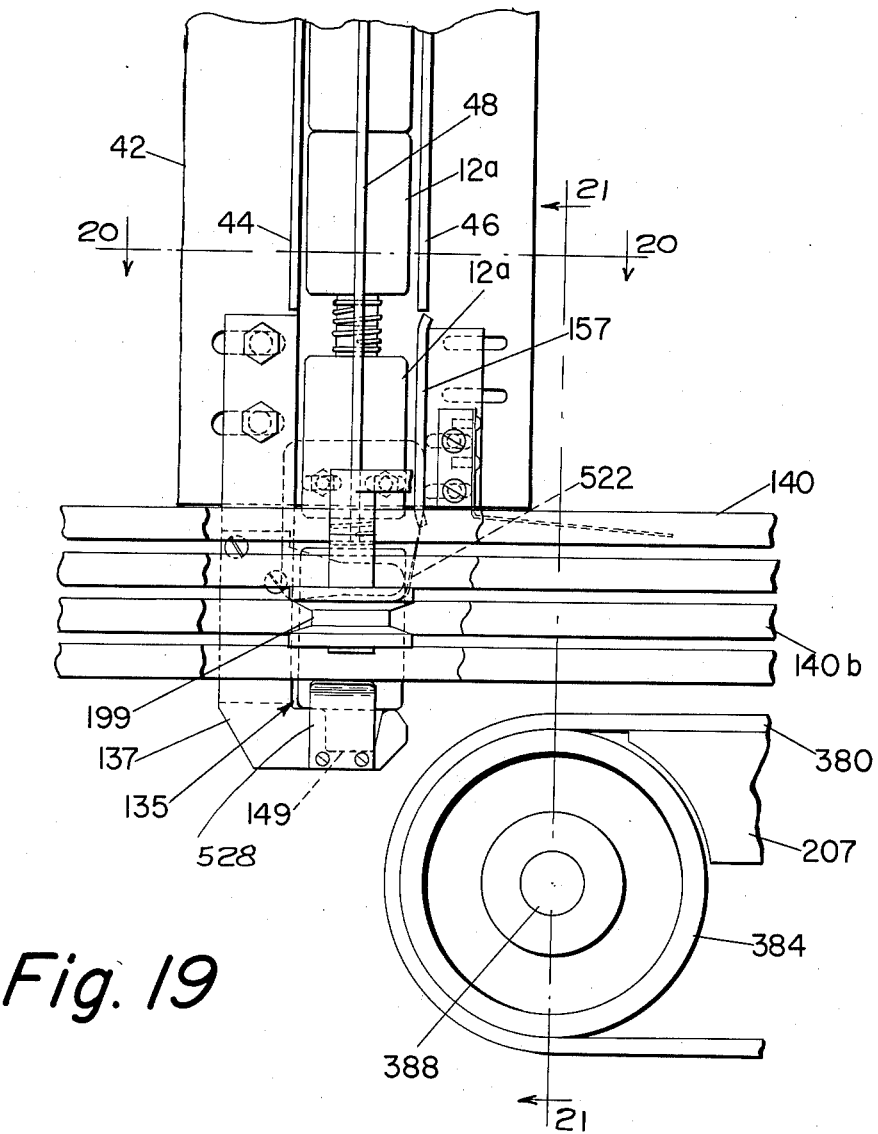
FIG. 19 is a front elevation of the container transferring and orienting mechanism shown in a different position of adjustment for handling a smaller size container and showing a modified arrangement for supporting the lowermost container between the side belts.
Figure 20:
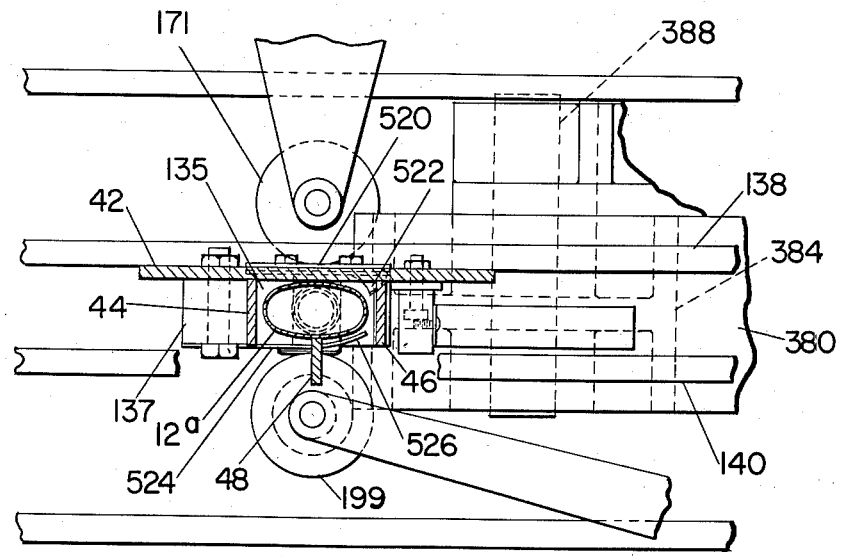
FIG. 20 is a horizontal sectional view taken on the line 20—20 of FIG. 19.

The air cylinder 190 also forms part of the pneumatic control system diagrammatically illustrated in FIG. 18 and also includes a cam operated poppet valve to be described arranged to effect rocking of the arm 174 whereby to cyclically engage and transfer successive lowermost bottles onto the conveyer 34 in a horizontal position and with the closed ends of the bottles in a leading direction. As illustrated in FIGS. 4 and 12, an opposing bracket roller 198 is carried by an arm 200 adjustably mounted on an upright stud 202 supported in a bracket 204 which in turn is secured to the conveyer supporting frame which includes the side rails 206, 207.

In operation it will be seen that when a lowermost bottle 12, disposed in the pocket 134, is gripped at a medial portion thereof between selected opposed belts 138a, 140a, it will be carried forward in the direction of the open end of the pocket 134. If the bottle is upside down with the neck portion 150 disposed in the cutout 148, the neck portion 150 will be impeded or tripped by the edge of the cutout to effect rotation of the bottle in a clockwise direction whereby to present the closed end of the bottle in a leading direction as illustrated in FIG. 15. It will be observed that the edge 208 of the cutout 148 is formed at an angle to facilitate withdrawal of the neck portion from the cutout as the bottle is advanced, and that sufficient clearance is provided for the upper or closed end of the upside down bottle to clear the tripping extension 156 defining the upper edge of the open end of the pocket as the bottle is turned clockwise during withdrawal thereof from the pocket. The upside down bottle thus turned on its side is then released by retraction of the gripping roller 170 and is free to fall by gravity between the spaced side belts 138, 140 onto the conveyer 34 in a horizontal position.

On the other hand, if the lowermost bottle is received in the pocket right side up, that is, with the open end or neck at the top, when the bottle is gripped medially thereof and advanced by the selected belts 138a, 140a, the neck portion 150 will be impeded by the tripping extension 156 to effect rotation of the bottle in a counterclockwise direction whereby to likewise present the closed end of the bottle in a leading direction as illustrated in FIG. 14. It will be seen by the different dotted line positions illustrated that such right side up bottle is initially advanced laterally in a vertical position until the neck portion 150 of the bottle engages the tripping extension 156, and at this time the bottom or closed end of the bottle resting on the upper surface 154 of the horizontal arm of the pocket 134 has advanced to a point where the trailing portion of the closed end will clear the edge of the cutout 148 so that subsequent rotation of the bottle in a counterclockwise direction may be effected without interference by the cutout. The right side up bottle thus turned on its side is likewise released by retraction of the gripping roller 170 and is also free to fall by gravity between the spaced side belts 138, 140 onto the conveyer 34 in a horizontal position.

It will be understood that the spring arm 164 loosely embracing one side of the lowermost bottle in the pocket 134 is not sufficiently rigid to have any effect in retaining the bottle in the pocket or in preventing rotation of the bottle when the latter is gripped and advanced by the belts 138a, 140a. As illustrated in FIGS. 14 and 15, a flat metal leaf spring 212 secured to the tripping extension 156 and extended forwardly and downwardly therefrom in the direction of advance of the bottle is provided to retain the bottle down horizontally on the conveyer in the event that impact with the conveyer should cause the relatively lightweight plastic bottle to bounce upwardly when released by the gripping mechanism. In practice successive lowermost bottles 12 must be fully seated in the pocket 134 in order to be medially gripped and transferred each cycle of operation in the manner described. For example, if a single resilient plastic bottle of relatively light weight is permitted to fall by gravity into the pocket 134 it might bounce upwardly in the pocket out of operative position to be gripped medially and transferred by the orienting and transferring mechanism 32. In the illustrated embodiment of the invention full seating of successive lowermost bottles in the pocket is assured by maintaining a substantially constant supply or reservoir of bottles in the vertical chute of a predetermined number or height such as to provide a sufficient weight or head above the lowermost bottle to cause it to assume a fully seated position and to prevent rebounding of the bottle upon striking the bottom of the pocket. It will also be seen that during rotation of the bottle out of the pocket the group of bottles above the lowermost bottle may be lifted upwardly a short distance when the lowermost bottle assumes a diagonal position in the pocket. Thereafter, when the bottle is further advanced and rotated the group in the chute will be lowered by gravity to present the next succeeding bottle in its fully seated position in the pocket 134. Thus, in practice, it is preferred to maintain a group or head of bottles in the chute which is sufficiently light in weight to permit lifting of the group by a bottle being advanced and rotated from the bottom of the group without interfering with the orienting operation, and yet of sufficient weight to effect prompt lowering of the group to advance the next lowermost bottle into the pocket in time to be engaged and advanced by the side belts during the next cycle of operation.

Figure 9:
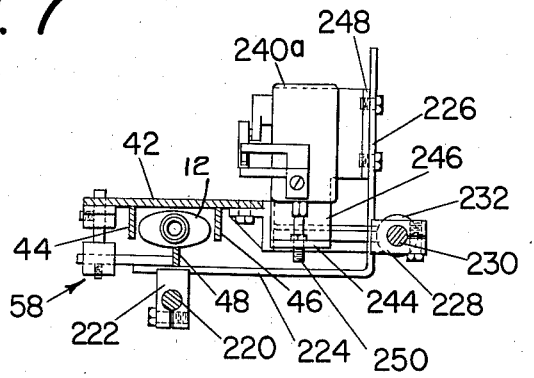
Figure 10:
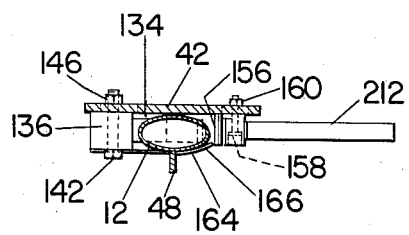
Figure 11:
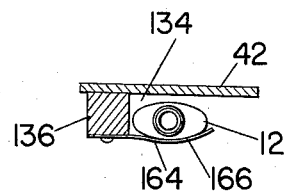

As herein shown, provision is made for maintaining the height of the bottles in the chute within minimum and maximum limits by the pneumatically operated upper and lower detecting units 36, 38, respectively. Each detecting unit includes an air nozzle indicated at 218a in the upper unit and 218b in the lower unit, each nozzle being carried at the upper end of a stud 220 mounted for vertical adjustment in a bracket 222. The bracket 222 is mounted for lateral adjustment on one leg 224 of a horizontally disposed angle bar, the second leg 226 thereof being adjustably secured to a similar bracket 228 mounted for adjustment on a vertical shaft 230. The shaft 230 is supported by vertically spaced brackets 232 extending from and secured to the rear supporting guide plate 42 of the chute. The air nozzles 218a, 218b are operatively connected in the pneumatic control system shown in FIG. 18 and are controlled by a cam operated poppet valve arranged to cause the nozzles to eject a stream of air each cycle of operation, the stream passing through the chute to strike vane 236 carried at the upper end of a switch arm 238 of a microswitch indicated at 240a in the upper unit 36 and at 240b in the lower unit 38. It will be observed that the front guide bar 48 is provided with semicircular offsets 49 and openings 51 are provided in the rear plate 42 to avoid interference with the streams of air discharged by the nozzles. Each microswitch 240a, 240b is supported on a hinged plate 242 carried by an upstanding leg 244 of an L-shaped bracket. The horizontal leg 246 of the bracket is provided with a laterally extended angle portion 248 which is connected to the leg 226 of the nozzle supporting bracket as shown in FIG. 9. The hinged mounting of the microswitch permits pivotal adjustment thereof to assure efficient operation and, as herein shown, an adjusting screw 250 carried by the upstanding leg 244 of the bracket is arranged to engage a side wall of the switch, and an adjusting screw 252 carried by the horizontal leg 246 of the bracket is arranged to engage a bottom wall or the underside of the hinged supporting plate 242 to retain the switch in its adjusted position.

The microswitch 240b of the lower detecting unit 38 is normally open and forms part of an electrical circuit, also shown in FIG. 18, including a solenoid operated valve 256 which when energized is arranged to cut off the supply of air to the cylinder 190 and discontinue withdrawal of successive lowermost bottles when the height of the reservoir of bottles falls below the predetermined minimum defined by the lower nozzle 218b. In operation when the group of bottles is built up to a sufficient height so as to intercept and deflect the cyclically discharged jet of air from the lower nozzle 218b, the normally open microswitch 240b will remain open, and the solenoid valve 256 will not be actuated to cut off the supply of air to the cylinder 190. Under normal operating conditions a new bottle released by the mechanism 30 will replace the uppermost bottle of the group between cyclical discharges of air from the lower nozzle 218b so that the air cylinder 190 will be operated each cycle. However, in the event the group of bottles falls below the plane of the lower nozzle 218b, the jet of air discharged from the nozzle during a cycle will strike the vane 236 and rock the switch arm 238 to close the switch 240b and thus prevent operation of the air cylinder 190 during such cycle, the switch arm 238 returning to its normally open position when the jet is discontinued. Thus, the lower detecting unit 38 assures maintenance of predetermined minimum height or reservoir of bottles in the chute to assure proper functioning of the bottle gripping and advancing mechanism 32.

The microswitch 240a of the upper detecting unit 36 is normally closed and is arranged to energize a solenoid operated valve 254 to cut off the supply of air to the cylinder 108 which operates the releasing mechanism 30. During normal operation a jet of air discharged from the upper nozzle 218a will strike the vane 236 each cycle of operation to effect rocking of the arm 238 and opening of the switch 240a to thus deenergize the solenoid valve 256 and permit flow of air through valve 254 and operation of the air cylinder 108 each cycle of operation. However, in the event that the group or reservoir of bottles in the chute builds up to a maximum height defined by the upper nozzle 218a the cyclically operated jet will be deflected, and as a result the switch 240a will remain in its normally closed position to maintain the solenoid valve 254 energized to cut off the supply of air to the cylinder 108 and to prevent release of a bottle during such cycle. Thus, the upper detecting unit 36 prevents building up of the group of bottles in the chute above a predetermined maximum height to assure proper functioning of the bottle gripping and advancing mechanism 32 and also to prevent jamming of bottles between the releasing mechanism 30 and the top of the group in the chute.

In order to prevent a falling bottle released by the mechanism 30 from cutting off the jet of air as a bottle passes the upper nozzle 218a each cycle and thus provide a false signal which would render the releasing mechanism inoperative, the releasing mechanism is timed so that the falling bottle will pass the upper nozzle 218a between cycles of air discharge from the nozzles, thus permitting continuous cyclical operation of the releasing mechanism during normal operation.

Referring now to FIG. 17, the mechanism for controlling the operation of the air cylinders 108, 190 and for timing the operation thereof includes a plurality of cam operated valves which are included in the pneumatic control system diagrammatically illustrated in FIG. 18. As shown in FIG. 17, a poppet valve 109 for controlling the air to the bottle releasing cylinder 108 is mounted on one side of an upstanding bracket 258 secured to the motor platen 259. The valve 109 is provided with a spring pressed piston having a projecting head portion 260 arranged to cooperate with an arm 262 pivotally mounted at 264 in the valve body. The free end of the arm 262 is provided with a roller 266 which cooperates with a cam 268 fast on a cam shaft 270. As shown in FIG. 2, one end of the cam shaft is supported in a bearing member 272 attached to the platen 259, and the other end of the cam shaft is connected to the output shaft of a speed reducing unit 276. The input shaft of the speed reducing unit is connected by a coupling 280 to the motor shaft 282. A second and similar poppet valve 196 for controlling the air to the gripping cylinder 190 is mounted on the opposite side of the bracket 258, see FIG. 2, and is arranged for cooperation with a second cam 292 fast on the cam shaft. A third and similar poppet valve 234, shown in cross section in FIG. 17, is mounted on an opposing bracket 284 secured to the platen 259 on the other side of the shaft 270. The poppet valve 234 is also provided with a pivotally mounted arm 286 carried by the valve and engageable with the piston 288 and is also provided with a roller 290 arranged to cooperate with a cam 294 also fast on the cam shaft 270 for controlling the timing of the release of air from the nozzles 218a, 218b. A fourth cam 296 fast on the cam shaft 270 is arranged to cooperate with a roller 297 carried by a switch arm 299 for periodically opening and closing a timing switch 298 forming a part of the circuit to the solenoid valves 254, 256. Each cam may be provided with a slotted cam disk 300 on which the cams may be individually rotated and to which the cams are secured for adjusting the timing of the various operations.

As diagrammatically illustrated in FIG. 18, the pneumatic control system comprises a main supply conduit 302 leading from a regulated source of compressed air, not shown, and which is provided with a conventional filter 304, pressure regulator 306 and oiler 308. A line 310 from the supply conduit leads to the cam operated poppet valve 109, and a line 340 is connected between the poppet valve and a pilot valve 314 for controlling the air to the releasing mechanism cylinder 108. A branch line 312 from the line 310 also leads to the pilot valve 314. The pilot valve is provided with valve member 316 movable therein and having spaced cylindrical portions forming an end chamber 318 and two operating chambers 320, 322. A spring 324 normally urges valve member 316 to the right to align the conduit 312 with the chamber 320. A conduit 326 from the chamber 320 is connected to the lower chamber 328 of the cylinder 108 arranged to force the piston 330 thereof upwardly. The upper chamber 332 of the cylinder 108 is connected by a conduit 334 to the chamber 322 of the pilot valve 314 which at this time is open to the atmosphere through a vent opening 336.

The cam operated poppet 109 is normally closed by a spring 338, and in operation when the valve is opened by the cam 268 the air passes through the conduit 340 communicating with the end chamber 318 to effect movement of the pilot valve member 316 to the left to align the conduit 312 with the right hand chamber 322 whereby to supply pressure to the upper chamber 332 of the cylinder 108. At this time the pressure in the lower chamber 328 is relieved through the left hand chamber 320 and vent opening 342.

A similar arrangement is provided for operating the cylinder 190 for gripping and advancing successive lowermost bottles from the chute and, as herein shown, a line 344 leads from the line 310 to a second pilot valve 346 having conduits 348, 350 leading to the upper and lower chambers of the cylinder 190. A line 352 from the line 310 is connected to the poppet valve 196 arranged to be actuated by the cam 292, and a line 354 from the poppet valve 196 leads to the end chamber of the pilot valve 346. The structure and mode of operation is the same as that above described so that during normal operation the releasing mechanism 30 and the gripping and advancing mechanism 32 are operated each cycle.

The air to the upper and lower nozzles 218a, 218b is supplied through a line 356 from the main supply line 302 leading to a poppet valve 234 arranged to be actuated by the cam 294 for cyclically controlling and timing the discharge of air from the nozzles. A line 357 from the poppet valve 234 leads to the nozzles 218a and 218b, and the line 357 is also provided with a pressure gauge 358 and a pressure regulator 360 for controlling the pressure to the nozzles 218a, 218b.

The electrical circuit for controlling the solenoid valves 254, 256 is also shown in FIG. 18. As therein shown, the timing switch 298 connected to a source of power by leads 364, 366 is arranged to be closed each cycle by the cam 296 at a predetermined time in the cycle. A lead 368 from the switch 298 is connected to one terminal of the solenoid valve 254 shown in the line 326 to the cylinder 108. A lead 370 is connected from a second terminal of the solenoid valve 254 to the normally closed switch 240a, and a lead 372 from the switch 240a completes the circuit to the timing switch 298. A similar circuit is provided for controlling the solenoid valve 256 in the line 350 to the cylinder 190 and includes a lead 374 from the timing switch 298 to the solenoid valve 256; a lead 376 from the valve 256 to the normally open switch 240b; and a return lead 378 from the switch 240b to the timing switch 298. Thus, in operation when the group of bottles in the chute falls below a predetermined minimum level, the normally open switch 240b will be closed to cut off the air to the cylinder 190 and discontinue withdrawal of bottles from the chute until the group is again built up by additional bottles released by the mechanism 30. Also, when the group builds up beyond a predetermined maximum level, the normally closed switch 240a will remain closed to energize the solenoid 254 and cut off the air to the cylinder 108 to discontinue operation of the releasing mechanism 30 until the group is again reduced by withdrawal of successive bottles from the chute by the gripping and advancing mechanism 32.

Referring now to FIG. 1, the conveyer 34 may and preferably will include a belt 380 which is arranged to run over a driven pulley 382 at the delivery end of the conveyer, and over an idler pulley 384 at the receiving end of the conveyer. The idler sprocket 384 is mounted to rotate on a shaft 388 supported in a bracket 390 secured to the stanchion 182. It will be seen that the idler end of the conveyer terminates immediately in front of the bottle orienting and transferring station 32 and is substantially flush with the upper surface 154 of the pocket 134 to receive successive bottles transferred from the pocket to the conveyer and to carry the bottles away from the orienting mechanism to be engaged by the bottle righting mechanism 40. The driven pulley 382 is mounted fast on a shaft 392 journaled in bearings 394 formed in a supporting bracket 396 secured to a second upright floor stanchion 398. The shaft 392 is also provided with a sprocket 400 fast thereon which is connected by a chain 402 to the output shaft 404 of a speed reducing unit 406. The input shaft of the speed reducing unit 406 is connected by a belt drive 410 to an electric motor 412, the motor and the speed reducing unit being mounted on the supporting platen 259 secured to a bracket 416 attached to the stanchion 398.

The drive chain 402 is also arranged to drive the side belts 138, 140 and, as herein shown, the chain 402 runs over an intermediate sprocket 420 mounted on a shaft 422 supported in the bracket 396 and around an idler sprocket 424 mounted on a shaft 426 also supported in the bracket 396. The intermediate sprocket 420 is formed integrally with a second sprocket 428 which is connected by a chain 430 to a sprocket 432 fast on a drive shaft 434 forming a part of the driving mechanism to the side belts 138, 140, see FIG. 3. The shaft 434 is supported for rotation in opposed brackets 436, 438 secured to the conveyer frame and, as herein shown, the shaft 434 is connected by a pair of bevel gears 440 to the lower end of a vertical shaft 442 supported in the bracket 436 and provided at its upper end with a grooved pulley 444 which carries the vertically spaced side belts 138. The shaft 434 is connected by a second pair of bevel gears 446 to the lower end of a second vertical shaft 448 supported in the opposing bracket 438 and which is provided at its upper end with a grooved pulley 450 which carries the vertically spaced side belts 140. As shown in FIGS. 1 and 2, the upper end of the bracket 438 which supports the pulley 450 is mounted for lateral adjustment on a pair of spaced studs 452 supported in the conveyer frame whereby to permit adjustment of the spacing between the side belts 138, 140. Some of the belts 138, 140 extend the length of the conveyer and run over similar end pulleys 454, 456, respectively, supported at the receiving end of the conveyer. The pulleys 454, 456, which comprise idler pulleys, are rotatably mounted on upright shafts 458, 460, respectively, secured in pivotally mounted brackets 462, 464 attached to longitudinally adjustable slide plates 467 supported in the upper end of the conveyer supporting bracket 465. The slide plates 467 are provided with adjusting screws 469 engageable with the end of the bracket 465 to serve as belt tighteners. As herein shown, the brackets 462, 464 carried by the slide plates 467 are mounted for pivotal movement in order to vary the lateral spacing between the side belts. As shown in FIG. 2, each of the brackets 462, 464 is secured to the slide plates 467 by bolts 466 which extend through curved slots 468 in the plates for pivotal adjustment about the bolts 470.

It will be observed that the lowermost of the opposed side belts 138, 140 extending from the idler pulleys 454, 456, respectively, are arranged to run around the lower groove of intermediate pulleys 472, 474 disposed adjacent the bottle righting station 40, and the uppermost of the opposed side belts extending from the drive pulleys 444, 450 are arranged to run around the upper grooves of the intermediate pulleys 472, 474. The intermediate pulleys 472, 474 are rotatably supported on upright shafts 476, 478, respectively, the shaft 476 being supported in a bracket 480 secured to and mounted for longitudinal adjustment on the conveyer frame. The shaft 478 is supported in a bracket 482 mounted for longitudinal adjustment on a longitudinally extended bracket 484 supported between and mounted for lateral adjustment on spaced studs 486 secured to and extended from the conveyer frame. Thus, it will be seen that the section of the side belts extending between the pulleys 472, 474 and 444, 450 is elevated slightly relative to the section of the side belts extending between the pulleys 454, 456 and 472, 474. This arrangement is provided in order to accommodate the bottle righting mechanism 40 which includes a stationary tripping and elevating bar 488 extending in the path of the bottles being advanced on the conveyer 34. The bar 488 is provided with laterally extended lugs 490 which are secured by bolts 492 to brackets 494 attached to the conveyer frame. The lugs 490 are provided with slots to permit longitudinal adjustment of the tripping and elevating bar. It will also be observed that the belt 380 extends below the tripping and elevating bar 488 and is guided upwardly along inclined portions 498 of the conveyer frame to present the extended portion of the belt 380 substantially flush with the delivery end of the bar 488.

As illustrated in FIG. 2, the section of the opposed side belts 138, 140 extending between the receiving end pulleys 454, 456 and the intermediate pulleys 472, 474, respectively, forms a tapering path indicated at 500 which is wider at the receiving end and becomes narrower as it approaches the intermediate pulleys. Thereafter a path 502 of uniform width is maintained between the intermediate pulleys 472, 474 and the delivery end pulleys 444, 450, respectively.

As hereinbefore described, the bottles handled by the illustrated apparatus are oval or elliptical in cross section, and successive lowermost bottles in the vertical chute presented to the orienting and transferring mechanism 32 are gripped at a medial portion of the minor axis of the ellipse to present the bottles horizontally on the conveyer belt 380 with the major axis of the ellipse extended vertically. In operation successive lowermost bottles advanced and turned to a horizontal position by the spaced side belts 138, 140 upon inward movement of the gripping roller 170 are permitted to fall by gravity between the side belts onto the conveyer belt 380 upon outward or releasing movement of the gripping roller 170. It is required that the bottles be fully seated at their lowermost position in direct engagement with the conveyer belt 380 for successful cooperation with the bottle righting mechanism, rather than be carried along in an elevated position gripped between the side belts. Thus, in order to assure that successive bottles may fall freely onto the conveyer belt 380 ample clearance space is provided between the side belts 138, 140 at the receiving end of the tapering path as described.

As the horizontally disposed bottles are carried along the conveyer belt 380 with the closed ends oriented to face in a leading direction they are engaged in gripping relation between opposed side belts 138, 140 as they are advanced toward the narrow end of the tapering path 500, and when a bottle thus gripped arrives at the bottle righting station 40, the lower portion of the leading end of the bottle strikes the end of the tripping and elevating plate or bar 488 and, as a result, the bottle is tipped or rotated into an upright position to rest on the upper surface of the bar. It will be observed that the upper surface of the bar has an upwardly inclined surface 504, and in operation the upright bottle carried between the side belts 138, 140 rides up the inclined surface onto a horizontal surface 506 flush with the elevated portion of the link belt 380. The righted bottle is then discharged from between the side belts and is carried along on the conveyer belt 380 to be transferred to a supply conveyer, not shown, for subsequent operations, such as cleaning or filling.

As illustrated in FIGS. 1 and 2, a plurality of belt tighteners 508 may be provided along selected portions adjacent the tapering path adapted to engage and support individual selected belts 138, 140, some of the belt tighteners being arranged to vary the width of the tapering path at such selected portions. As herein shown, each belt tightener comprises a grooved roller 510 carried by an arm 512 adjustably clamped to a vertical shaft 514 secured to a bracket 516 mounted on the conveyer frame. The tightener rolls 510 may be arranged in staggered relation, as shown, wherein the rolls on one side of the conveyer engage the second and fourth side belts from the top, and the rolls on the other side of the conveyer engage the first and third belts from the top.

Referring now to FIGS. 19–22, a modified form of pocket structure indicated at 135 is provided for the purpose of accommodating bottles of a height such that the lowermost bottle in the pocket is less than the height of the side belts 138, 140. The bottles indicated at 12a are also smaller in cross sectional area so that the side guide rails 44, 46 and the front guide rail 48 may be adjusted to accommodate the smaller cross sectional shape of the bottle. The L-shaped bracket 137 defining the pocket 135 may be provided with a relatively shorter horizontal leg and is also provided with a cutout portion 149 therein to accommodate the smaller bottle. The tripping extension 157 may be secured to the base plate 42 in a different set of slotted openings as indicated. It will be observed that in the modified structure in order to grip the lowermost bottle medially thereof the movable gripping roller 171 and the stationary gripping roller 199 are adjusted to engage the belts next to the bottom belts of the group, such belts being indicated at 138b and 140b.

Figure 21:
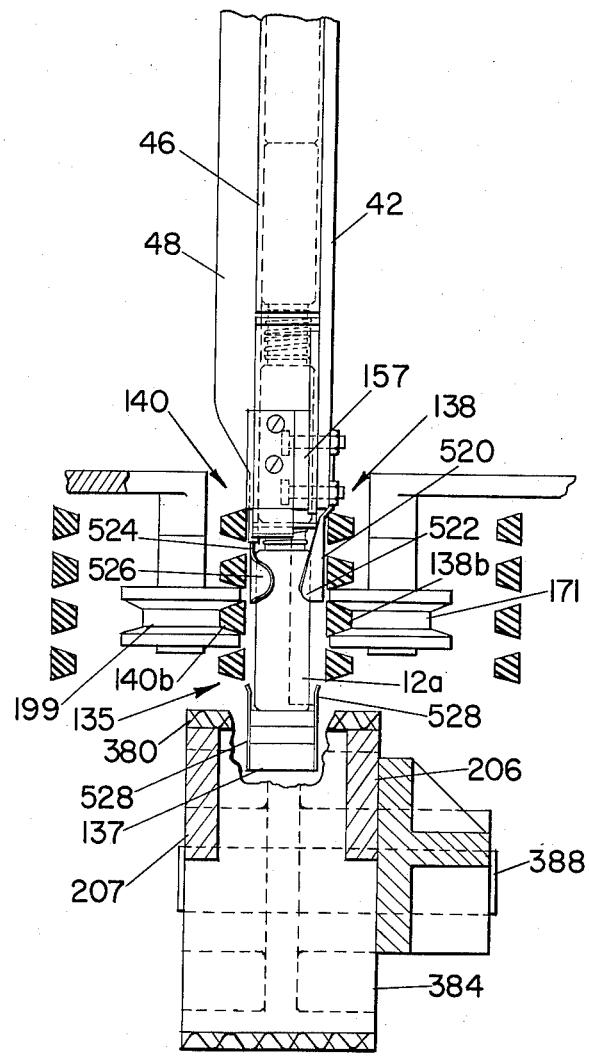
FIG. 21 is a vertical cross section taken on the line 21—21 of FIG. 19.

In order to support the lowermost bottle in the pocket free of engagement with the side belts 138, 140 until the gripping roller 171 is operated, the base plate 42 is provided with an extension 520 which enters between the belts 138 and the adjacent side of the bottle and terminates at a point just above the gripping belt 138b to support the upper portion of the bottle from lateral engagement with the belts 138 as best shown in FIG. 21. The forward edge of the extension 520 may be curved inwardly slightly as indicated at 522 to prevent forward displacement of the bottle in the pocket 135. A relatively thin flat spring metal arm 524 secured to and extended from the vertical leg of the L-shaped bracket 137 extends between the belts 140 and the adjacent side of the bottle and is arranged to loosely engage the upper portion of the bottle to prevent lateral displacement into engagement with the side belts 140. The spring arm 524 also terminates at a point just above the gripping belt 140b, and the forward end of the spring arm is also curved inwardly slightly as indicated at 526 to form with the rigid curved portion 522 a temporary barrier to prevent forward movement of the bottle. Thereafter, when the selected belt 138b is pressed inwardly the bottle is moved laterally beyond the inwardly curved end 522 of the extension and into engagement with the belt 140b to permit forward movement of the bottle out of the pocket, the opposing relatively thin spring arm 524 being resiliently pressed outwardly at this time. It will also be observed that the horizontal leg of the L-shaped bracket 137 is provided with opposed upwardly extended flat leaf spring extensions 528 to support the lower end of the bottle in the pocket.

Figure 22:
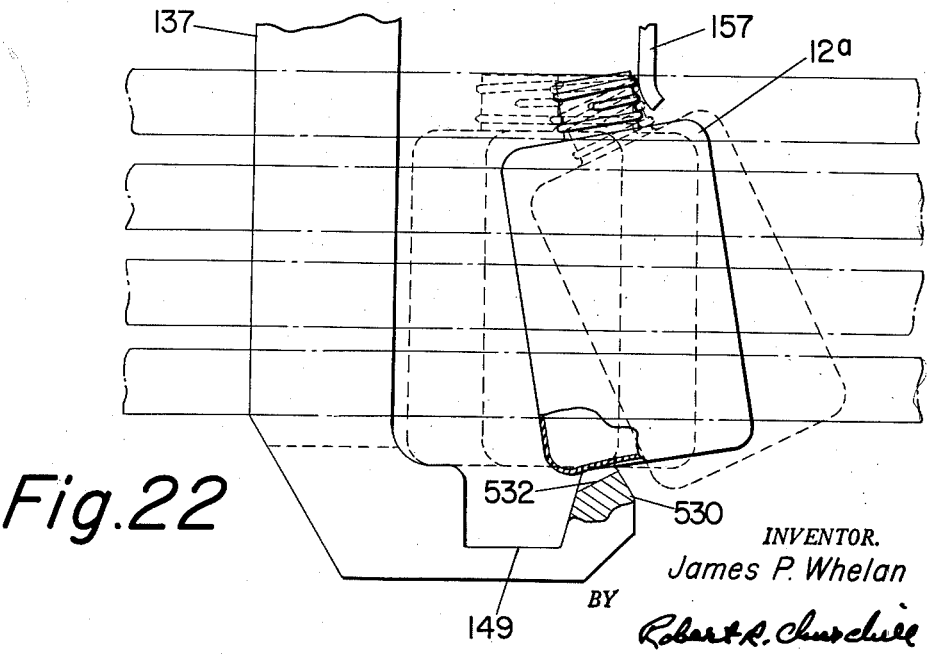
FIG. 22 is an enlarged detail view showing the different positions assumed by a right-side-up container as it is transferred and oriented.

In operation successive lowermost bottles are withdrawn from the pocket and rotated to dispose the bottles in a horizontal position with the neck ends thereof in a trailing position in the same manner as above described. As illustrated in FIG. 22, a right-side-up bottle which is rotated counterclockwise when it engages the tripping extension 157 may engage the upper edge of the hooked portion 530 of the pocket formed by the cutout 149. As herein shown, in order to provide clearance for the bottom edge of such bottle as it is advanced and rotated, the hooked portion is provided with a central clearance cutout 532 as shown.

Although the present apparatus has been defined as particularly adapted for handling plastic squeeze type bottles, it will be apparent that the apparatus is also capable of use with other types of containers of different materials, such as glass or metal containers, and may also be used to orient and stand upright elongated articles other than containers.

In practice the drives to the conveyer belt 380 and the side belts 138, 140 preferably include variable speed driving connections, as indicated at 518, which may be adjusted to suit the rate of feed of the containers released into the chute and the rate of transfer from the lower end of the chute to the conveyer belt 380. Also in practice the drives are arranged to coordinate the releasing, transferring and control mechanisms with the gravitational rate of feed of the bottles through the chute and with the rate of speed of the conveyer belts. Furthermore, as hereinbefore described, each timing cam for actuating its respective releasing, transferring, safety control and timing switch mechanisms is individually adjustable to coordinate the timing of such operations with the gravitational fall of the containers deposited into the chute so as to render the apparatus capable of handling containers of different lengths and weights.

The bottle gripping mechanism forming a part of the orienting and transferring mechanism 32 has been herein defined as comprising a movable gripping roller 170 and a stationary backing roller 198. Such structure operates to successfully grip and advance rigid containers and also semirigid containers, such as plastic bottles. However, in some instances, such as when a relatively soft or resilient plastic bottle is handled in the present apparatus, it was found more expedient to provide movable gripping rollers on both sides of the container in order to grip and advance the container into operative engagement with the turning elements. This may be accomplished by simply connecting the movable roller mechanism with suitable linkage to the opposing roller for simultaneous operation.

From the above description it will be observed that the present container handling apparatus is adapted to handle containers supplied thereto in bulk and in randomly arranged condition and to automatically align and orient the same to provide an upright line of containers for delivery to the supply conveyer of a container cleaning or filling machine or other machine for performing subsequent operations on the containers.

While the preferred embodiment of the invention has been herein illustrated and described, it will be understood that the invention may be embodied in other forms within the scope of the following claims.

Having thus described the invention, what is claimed is:

1. Article handling apparatus comprising means for guiding articles longitudinally end to end with their ends facing indiscriminately in either a leading or a trailing direction, means for medially gripping and laterally withdrawing successive articles from said guide means to present the articles in longitudinal alignment with their corresponding ends all facing in the same direction.

2. Article handling apparatus comprising means for guiding articles longitudinally end to end with their ends facing indiscriminately in either a leading or trailing direction, means for medially gripping and laterally withdrawing successive articles from said guide means to present the articles in longitudinal alignment with their corresponding ends all facing in the same direction, a conveyer for receiving and advancing successive aligned articles, and means for standing upright successive articles on said conveyer.

3. Article handling apparatus comprising a guide chute for guiding articles longitudinally end to end with their open ends facing indiscriminately in either a leading or trailing direction, means for medially gripping and laterally withdrawing and orienting successive lowermost articles from said guide chute to present the articles in horizontal longitudinal alignment with their corresponding ends all facing in a trailing direction, a conveyer for receiving and advancing successive oriented articles, and means for standing upright successive articles advanced on said conveyer.

4. Container handling apparatus comprising a vertical guide chute, means for depositing containers longitudinally end to end into the chute with their open ends facing indiscriminately in either a leading or trailing direction, means for medially gripping and laterally withdrawing and orienting successive lowermost containers from said guide chute to present the containers in horizontal longitudinal alignment with the open ends all facing in a trailing direction, a conveyer for receiving and advancing successive oriented containers, and means for standing upright successive containers advanced on said conveyer.

5. In container handling apparatus for handling containers having a neck portion at one end, in combination, a vertical guide chute, means for depositing containers longitudinally end to end into the chute with their neck ends facing indiscriminately in either a leading or a trailing direction, means for withdrawing and orienting successive lowermost containers laterally from said guide chute to present the containers in horizontal longitudinal alignment with the neck ends all facing in a trailing direction, said orienting means including means for gripping successive containers medially thereof and advancing the same laterally, means for effecting rotation of the containers about their medially gripped portions in one direction or the other during said advance depending on the position of the neck portion, a conveyer for receiving and advancing successive oriented containers, and means for standing upright successive containers advanced on said conveyer.

6. In container handling apparatus for handling containers having a neck portion at one end, in combination, a vertical guide chute having a pocket at its lower end open on one side, means for depositing containers longitudinally end to end into the chute with their neck ends facing indiscriminately in either a leading or a trailing direction, means for gripping successive lowermost containers medially thereof and advancing the same laterally through the open side of said pocket, means for effecting rotation of the containers about their medially gripped portions in one direction or the other depending on the position of the neck portions to present the containers in horizontal longitudinal alignment with the neck ends oriented to all face in a trailing direction, a conveyer for receiving and advancing successive oriented containers, and means for standing upright successive containers advanced on said conveyer.

7. Container handling apparatus as defined in claim 6 wherein the pocket is provided with means for temporarily retaining the lowermost container therein to prevent premature displacement thereof until it is engaged by said gripping and advancing means.

8. In container handling apparatus for handling containers having a neck portion at one end, in combination, a vertical guide chute having a pocket at its lower end open on one side, means for depositing containers longitudinally end to end into the chute with their neck ends facing indiscriminately in either a leading or a trailing direction, orienting means comprising means for gripping medially thereof and advancing successive lowermost containers laterally through said side opening, means for effecting rotation of the containers about the medially gripped portions in one direction or the other depending on the position of the neck portion as they are advanced through said side opening to present the containers in horizontal longitudinal alignment oriented with the neck ends all facing in a trailing direction, a conveyer for receiving and advancing successive oriented containers, and means for standing upright successive containers advanced on said conveyer.

9. Container handling apparatus for handling containers having a neck portion at one end, a vertical guide chute for guiding the containers longitudinally end to end with their neck ends facing indiscriminately in either a right-side-up or upside down direction, said guide chute having a pocket at its lower end open on one side, orienting means comprising means for gripping successive lowermost containers medially thereof and advancing the same laterally through said side opening, means for impeding the advance of the neck portion of an upside down container during said lateral advance to effect rotation of such container about its medially gripped portion and to present said container in a horizontal position with the neck end facing a trailing direction, means for impeding the advance of the neck portion of a right-side-up container during said lateral advance to effect rotation of such container about its medially gripped portion in an opposite direction to also present such container in a horizontal position with the neck end facing in a trailing direction, and a conveyer for receiving and advancing successive oriented containers in horizontal longitudinal alignment.

10. Container handling apparatus as defined in claim 9 wherein the means for impeding the advance of the neck portion of an upside down container comprises a cutout portion in the bottom of the pocket for receiving said neck portion, and wherein the means for impeding the advance of the neck portion of a right-side-up container comprises a portion of the guide chute defining the upper edge of the open side of the pocket.

11. Container handling apparatus as defined in claim 9 wherein the gripping and advancing means comprises continuously moving opposed side belts spaced to permit clearance for receiving successive lowermost containers therebetween, and means for periodically pressing and releasing said side belts into and out of gripping engagement with successive lowermost containers.

12. Container handling apparatus as defined in claim 9 which includes container righting means for standing upright successive oriented containers received and advanced on said conveyer.

13. Container handling apparatus as defined in claim 12 wherein the container righting means includes a tripping bar arranged in the path of successive containers advanced on said conveyer, and means engageable with the side walls of the containers arranged to raise the containers into an upright position when successive containers strike said tripping bar.

14. In apparatus for handling containers having a neck portion at one end, means for supporting containers in vertical longitudinal alignment with their neck ends facing indiscriminately in either a right-side-up or upside down direction, orienting means comprising continuously moving opposed side belts spaced at their receiving end to permit clearance for successive lowermost containers therebetween, said side belts providing a tapering path narrower at its delivery end, means for periodically pressing and releasing said side belts at the receiving end into and out of gripping engagement with successive lowermost containers medially thereof to remove and advance the same laterally from said supporting means, means for bodily turning successive laterally advanced containers in a clockwise or counterclockwise direction depending on the position of the neck portion of said lowermost container whereby to dispose successive containers in horizontal longitudinal alignment with the neck ends all facing in a trailing direction, a conveyer for receiving and advancing successive oriented containers through said tapering path to be gripped between the side belts at the narrower end thereof, and a tripping bar arranged in the path of the lower edges of successive containers at said narrower end of the tapering path whereby to effect righting of successive horizontally disposed containers gripped between said side belts.

15. In apparatus for handling containers having a neck portion at one end, orienting means comprising means for supporting a container vertically with its neck end facing indiscriminately in either a right-side-up or upside down direction, means for gripping the containers medially thereof and advancing the same laterally, means for impeding the advance of the neck portion of a right-side-up container during said lateral advance to effect rotation of the right-side-up container about its medially gripped portion in a direction such as to dispose the container in a horizontal position with the neck end facing in a trailing direction, and means for impeding the advance of the neck portion of an upside down container during said lateral advance to effect rotation of the upside down container about its medially gripped portion in an opposite direction to dispose the container in a horizontal position with the neck end also facing in a trailing direction.

16. In apparatus of the character described, means for supporting elongated articles in vertical longitudinal alignment, means for removing and turning successive lowermost articles including means engaging the article medially thereof and withdrawing the same laterally to dispose the same in horizontal longitudinal alignment, means for receiving and advancing the horizontally disposed articles, and means for righting successive articles being advanced.

17. A method of orienting containers having one correspondingly similar end portion which comprises in the steps of feeding containers longitudinally end to end without regard to the position of their corresponding ends to provide a vertically aligned group thereof, gripping successive lowermost containers in the group medially thereof and withdrawing the same rotating the container about its medially gripped portion in one direction or the other depending on the position of the correspondingly similar end portion to present the same in a horizontal position with the corresponding end portions all facing in the same direction.

18. A method of orienting containers having a correspondingly similar end which comprises in the steps of feeding containers longitudinally end to end with their corresponding end portions facing in an upside down or right-side-up direction to provide a vertically aligned group thereof, gripping successive lowermost containers in the group medially thereof and withdrawing the same laterally, rotating the container about its medially gripped portion in one direction or the other depending on the position of the correspondingly similar end to present the same in a horizontal position with the corresponding ends thereof all facing in the same direction, the upside down containers in said vertically aligned group being turned in a clockwise direction, and the right-side-up containers being turned in a counterclockwise direction.

19. A method of orienting containers having a neck portion at one end which comprises in the steps of feeding containers longitudinally end to end with their neck portions facing in an upside down or right-side-up direction to provide a vertically aligned group thereof, gripping successive lowermost containers in the group medially thereof and withdrawing the same laterally rotating the container about its medially gripped portion in one direction or the other depending on the position of the neck position to present the same in a horizontal position with the neck portions all facing in the same direction, the upside down containers in said vertically aligned group being turned in a clockwise direction, and the right-side-up containers being turned in a counterclockwise direction to provide a horizontally aligned group with the neck portions all facing in a trailing direction, advancing said horizontally aligned group, and standing upright successive containers as they are advanced.

20. In apparatus for handling containers having a neck portion at one end, a vertical guide chute having a pocket at its lower end open at one side, means for depositing containers longitudinally end to end into the upper end of the guide chute with the neck ends of the containers facing indiscriminately in either a right-side-up or upside down direction, means for retaining and periodically releasing successive containers deposited into the upper end of the chute to provide a group of longitudinally aligned containers in the lower end of the chute, orienting means comprising means for periodically gripping and removing successive lowermost containers medially thereof in timed relation to the operation of said releasing means, said gripping and removing means operating to advance the containers laterally through said side opening, means for effecting rotation of the containers about their medially gripped portions in one direction or the other depending upon the position of the neck portion as they are advanced through said side opening to present the containers in horizontal longitudinal alignment oriented with the neck ends all facing in a trailing direction, a conveyer for receiving and advancing successive oriented containers, and container righting means for standing upright successive oriented containers received and advanced by said conveyer.

References Cited in the file of this patent

UNITED STATES PATENTS

| | | |
|---|---|---|
| 1,658,428 | Charles | Feb. 7, 1928 |
| 1,696,715 | Huddleston | Dec. 25, 1928 |
| 2,158,069 | Grover | May 16, 1939 |
| 2,370,188 | Pellegrino | Feb. 27, 1945 |
| 2,370,325 | Ranney | Feb. 27, 1945 |
| 2,632,554 | Wilcox | Mar. 24, 1953 |
| 2,662,626 | Graham | Dec. 15, 1953 |